United States Patent
Ichikawa

(10) Patent No.: US 11,660,981 B2
(45) Date of Patent: May 30, 2023

(54) FUEL CELL VEHICLE AND METHOD OF CONTROL OF THE SAME

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 17/129,002

(22) Filed: Dec. 21, 2020

(65) Prior Publication Data

US 2021/0188129 A1 Jun. 24, 2021

(30) Foreign Application Priority Data

Dec. 23, 2019 (JP) .............................. JP2019-231599

(51) Int. Cl.
*B60L 58/30* (2019.01)
*B60K 35/00* (2006.01)
*B60L 50/75* (2019.01)

(52) U.S. Cl.
CPC .............. *B60L 58/30* (2019.02); *B60K 35/00* (2013.01); *B60L 50/75* (2019.02); *B60R 2300/205* (2013.01)

(58) Field of Classification Search
None
See application file for complete search history.

(56) References Cited

U.S. PATENT DOCUMENTS

| 7,966,121 B2 * | 6/2011 | Aoyagi | H01M 8/04313 |
| | | | 701/123 |
| 2006/0243503 A1 * | 11/2006 | Carlson | B60L 15/20 |
| | | | 180/65.23 |
| 2012/0115057 A1 | 5/2012 | Yoshida | |
| 2016/0272220 A1 * | 9/2016 | Ichikawa | B60W 20/10 |
| 2018/0031405 A1 * | 2/2018 | Berentsen | B60W 50/0097 |
| 2020/0307621 A1 * | 10/2020 | Ostrowski | G07C 5/008 |

FOREIGN PATENT DOCUMENTS

| JP | 2010-279124 A | 12/2010 |
| JP | 2015-041252 A | 3/2015 |
| JP | 2016-175485 A | 10/2016 |
| WO | 2011004493 A1 | 1/2011 |

* cited by examiner

*Primary Examiner* — Jared Fureman
*Assistant Examiner* — Joel Barnett
(74) *Attorney, Agent, or Firm* — Dinsmore & Shohl LLP

(57) ABSTRACT

A vehicle, which is a fuel cell vehicle, has an EV mode and an FC mode. In the EV mode, power generation by the FC stack is stopped and an electric power is supplied from a battery to a motor generator. In the FC mode, an electric power supplied from the FC stack to the motor generator is greater than an electric power supplied from the battery to the motor generator. In the EV mode, ECU controls an MID so that the MID displays the instantaneous electric power efficiency of the vehicle and does not display the instantaneous fuel efficiency of the vehicle. In the FC mode, ECU controls MID so that the MID displays the instantaneous fuel efficiency of the vehicle and does not display the instantaneous electric power efficiency of the vehicle.

6 Claims, 9 Drawing Sheets

FUEL CELL VEHICLE AND METHOD OF CONTROL OF THE SAME

CROSS REFERENCE TO RELATED APPLICATIONS

This nonprovisional application claims priority to Japanese Patent Application No. 2019-231599 filed on Dec. 23, 2019 with the Japan Patent Office, the entire content of which is hereby incorporated by reference.

BACKGROUND

Field

The present disclosure relates to a fuel cell vehicle and a method of control of the same, and more particularly, to a fuel cell vehicle having a fuel cell and a power storage device mounted thereon, and a method of control of the same.

Description of the Background Art

With growing awareness of the environment in recent years, a fuel cell vehicle (FCV), for example, as disclosed in WO 2011/004493, is developed.

SUMMARY

In general, various pieces of information are displayed on the instrument panel of a vehicle. For example, information about fuel efficiency is displayed for gasoline vehicles, and information about electric power efficiency is displayed for electric vehicles. In particular, for fuel cell vehicles, it is contemplated that the "instantaneous fuel efficiency" and the "instantaneous electric power efficiency" are displayed on the instrument panel. A driver can be aware of an impact of the vehicle on the environment by viewing the indications of the instantaneous fuel efficiency and the instantaneous electric power efficiency while driving the fuel cell vehicle.

The "instantaneous fuel efficiency" refers to a fuel efficiency during a predetermined short time. The short time is an amount of time that is sufficiently short to change the indicated value of the fuel efficiency time after time, in response to a travelling situation (such as an accelerator work) of the fuel cell vehicle, for example, about a few seconds. The fuel efficiency in the fuel cell vehicle is a travel distance per unit weight of a hydrogen fuel, and represented in [km/kg]. Similarly, the "instantaneous electric power efficiency" refers to an electric power efficiency during a short time (about a few seconds). The electric power efficiency is a travel distance per unit of amount of electric power, and represented in [km/kWh]. However, the unit of the electric power efficiency may be the inverse of the above, that is, an amount of electric power consumed per unit of distance traveled [kWh/km].

Among fuel cell vehicles, one has several driving modes. These driving modes can include "EV mode," "FC mode," and "FCEV mode." In the EV mode, the power generation by fuel cells is stopped and an electric power is supplied from a battery to the motor. In the FC mode, an electric power is supplied primarily from a fuel cell, that is, an electric power supplied from the fuel cell to the motor is greater than the electric power supplied from the battery to the motor. In the FCEV mode, an electric power is supplied primarily from the battery, that is, the electric power supplied from the battery to the motor is greater than the electric power supplied from the fuel cell to the motor.

The inventor focuses on the fact that when the instantaneous fuel efficiency and the instantaneous electric power efficiency are displayed on the instrument panel, it is difficult for the driver to correctly understood what is meant by the instantaneous fuel efficiency and/or the instantaneous electric power efficiency, depending on a driving mode of the fuel cell vehicle. It is desired to improve usability by providing indications that are easy for the driver to understand.

The present disclosure is made to solve the above problem, and an object of the present disclosure is to improve the usability related to the fuel efficiency and the electric power efficiency in the fuel cell vehicle.

(1) A fuel cell vehicle according to a certain aspect of the present disclosure includes: a motor that generates a driving force for the fuel cell vehicle; a fuel cell that supplies the motor with an electric power that is generated using a hydrogen fuel; a power storage device that supplies the motor with an electric power stored in the power storage device; a display; and a controller that controls the display. The fuel cell vehicle has a first driving mode and a second driving mode. In the first driving mode (EV mode), power generation by the fuel cell is stopped and an electric power is supplied from the power storage device to the motor. In the second driving mode (FC mode), an electric power supplied from the fuel cell to the motor is greater than an electric power supplied from the power storage device to the motor. In the first driving mode, the controller controls the display so that the display displays an instantaneous electric power efficiency of the fuel cell vehicle and does not display an instantaneous fuel efficiency of the fuel cell vehicle, and in the second driving mode, the controller controls the display so that the display displays the instantaneous fuel efficiency of the fuel cell vehicle and does not display the instantaneous electric power efficiency of the fuel cell vehicle.

When the instantaneous fuel efficiency is displayed in the first driving mode in which power generation by the fuel cell is stopped, the instantaneous fuel efficiency can be a too big value because the hydrogen fuel is not consumed in the first driving mode. In contrast, when the instantaneous electric power efficiency is displayed in the second driving mode in which the fuel cell is the primary source of supply of electric power, the instantaneous electric power efficiency can be a too big value because the electric power stored in the power storage device can be hardly consumed in the second driving mode. Accordingly, with the configuration described in (1) above, in the first driving mode, only the instantaneous electric power efficiency is displayed on the display, and, in the second driving mode, only the instantaneous fuel efficiency is displayed on the display. Owing to this, situations can be avoided in which a too big value is displayed as the instantaneous fuel efficiency in the first driving mode, or a too big value is displayed as the instantaneous electric power efficiency in the second driving mode. Thus, according to the configuration described in (1) above, the usability related to the fuel efficiency and the electric power efficiency can be improved.

(2) The fuel cell vehicle further has a third driving mode in which an electric power supplied from the power storage device to the motor is greater than an electric power supplied from the fuel cell to the motor. In the third driving mode, the controller controls the display so that the display displays the instantaneous electric power efficiency of the fuel cell vehicle and does not display the instantaneous fuel efficiency of the fuel cell vehicle.

In the third driving mode, an electric power supplied from the power storage device to the motor is greater than an electric power supplied from the fuel cell to the motor (the electric power supplied from the power storage device is preferentially consumed over the electric power supplied from the fuel cell). For this reason, only the instantaneous electric power efficiency is displayed on the display in the third driving mode. Owing to this, a situation can be avoided in which a too big value is displayed as the instantaneous fuel efficiency in the third driving mode. Accordingly, according to the configuration described in (2) above, the usability related to the fuel efficiency and the electric power efficiency can be improved.

(3) The fuel cell vehicle further has a third driving mode (FCEV mode) in which an electric power supplied from the power storage device to the motor is greater than an electric power supplied from the fuel cell to the motor. In the third driving mode, the controller controls the display so that the display displays both the instantaneous fuel efficiency and the instantaneous electric power efficiency of the fuel cell vehicle.

A typical fuel cell vehicle has a power storage device whose capacity is significantly less than (e.g., a fraction of to several tenths of) the amount of electric power that can be generated by the fuel cell. Thus, a situation is likely to occur in which the electric power from the fuel cell is consumed to some extent. Accordingly, the indications of the instantaneous fuel efficiency that is related to the consumption of the electric power the fuel cell can be displayed, in addition to the instantaneous electric power efficiency. With this, according to the configuration described in (3) above, the driver is allowed to know not only the instantaneous electric power efficiency, but also the instantaneous fuel efficiency, consequently, further increasing the driver awareness with respect to an impact of the vehicle on the environment.

(4) The controller controls the display so that the display displays a total travel distance that the fuel cell vehicle can travel with an electric power that can be generated by the fuel cell and the electric power stored in the power storage device.

According to the configuration described in (4) above, the driver is allowed to understand the total travel distance (the maximum remaining travel distance) once the entirely of the electric power has been consumed. Thus, the driver can readily determine an appropriate time to fill the vehicle with a hydrogen fuel or charge the power storage device, for example.

(5) In a method of control of a fuel cell vehicle, according to other aspect of the present disclosure, the fuel cell vehicle has a first driving mode and a second driving mode. In the first driving mode, power generation by a fuel cell is stopped and an electric power is supplied from a power storage device to a motor. In the second driving mode, an electric power supplied from the fuel cell to the motor is greater than an electric power supplied from the power storage device to the motor. The method includes a first step and a second step. In the first step, an instantaneous electric power efficiency of the fuel cell vehicle is displayed on a display and an instantaneous fuel efficiency of the fuel cell vehicle is not displayed on the display, while the fuel cell vehicle is traveling in the first driving mode. In the second step, the instantaneous fuel efficiency of the fuel cell vehicle is displayed on the display and the instantaneous electric power efficiency of the fuel cell vehicle is not displayed on the display, while the fuel cell vehicle is traveling in the second driving mode.

According to the configuration described in (5) above, as with the configuration described in (1) above, the usability related to the fuel efficiency and the electric power efficiency can be improved.

The foregoing and other objects, features, aspects and advantages of the present disclosure will become more apparent from the following detailed description of the present disclosure when taken in conjunction with the accompanying drawings.

DETAILED DESCRIPTION

Hereinafter, the present embodiment will be described, with reference to the accompanying drawings. Note that like reference signs are used to refer to like or corresponding parts, and the description will not be repeated.

Embodiment

<Overall Configuration of Vehicle>

Figure 1:
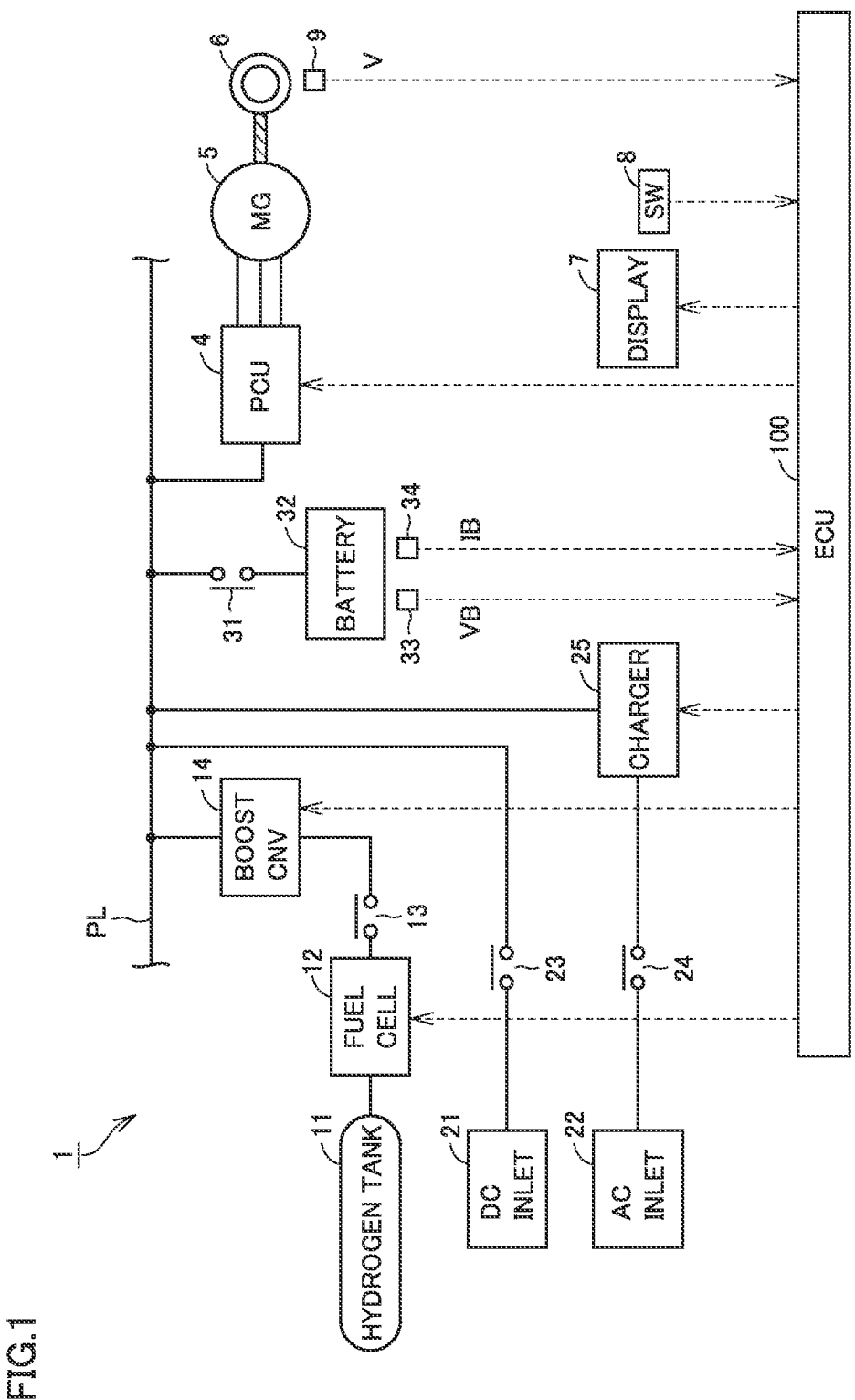
FIG. 1 is a circuit block diagram schematically showing an overall configuration of a vehicle according to an embodiment.

FIG. 1 is a circuit block diagram schematically showing an overall configuration of a vehicle according to Embodiment 1. Referring to FIG. 1, in the present embodiment, a vehicle 1 is a fuel cell vehicle. Vehicle 1 is also capable of external charging with an electric power supplied from outside the vehicle 1 (so-called plug-in charging). In other words, vehicle 1 is a plug-in fuel cell vehicle (PFCV). However, vehicle 1 is not required to be capable of plug-in charging.

Vehicle 1 includes a hydrogen tank 11, a fuel cell (FC stack) 12, a relay 13, a boost converter 14, a direct-current (DC) inlet 21, an alternating-current (AC) inlet 22, charge relays 23, 24, a charger 25, a system main relay (SMR) 31, a battery 32, a voltage sensor 33, a current sensor 34, a power control unit (PCU) 4, a motor generator 5, driving wheels 6, a display 7, a mode selector switch 8, a vehicle speed sensor 9, an electronic control unit (ECU) 100, and a power line PL.

Hydrogen tank 11 stores hydrogen. Although not shown, vehicle 1 further includes a supply inlet which receives supply of hydrogen from a hydrogen station.

FC stack 12 is a structure in which multiple (e.g., several tens to several hundreds of) FC cells are stacked in series. According to a control command from ECU 100, FC stack 12 consumes the hydrogen stored in hydrogen tank 11 to generate electric power. More specifically, the hydrogen stored in hydrogen tank 11 is conveyed to the anode side of FC stack 12 by a hydrogen pump (not shown). In contrast, an air is conveyed from an air pump (not shown) to the cathode side of FC stack 12. In this way, FC stack 12 causes hydrogen and oxygen in air to undergo an electrochemical reaction, thereby generating an electric power.

Relay 13 is electrically connected between FC stack 12 and boost converter 14. Relay 13 is opened/closed according to a control command from ECU 100.

According to a control command from ECU 100, boost converter 14 boosts the voltage of the electric power, generated by FC stack 12, and supplies the boosted electric power to power line PL.

DC inlet 21 and AC inlet 22 are each capable of receiving a connector (not shown) of a charging cable extending from charging equipment, such as a charging station. DC inlet 21 is a charge inlet for so-called fast charging, which receives a high-voltage DC power supplied from a charging station. DC inlet 21 is electrically connected to power line PL via relay 13. AC inlet 22 is a charge inlet for so-called normal charging, which receives an AC power supplied from a charging station. AC inlet 22 is electrically connected to charger 25 via charge relay 24. Charge relays 23, 24 are opened/closed according to a control command from ECU 100. Note that vehicle 1 is not required to have both DC inlet 21 and AC inlet 22 for the plug-in charging, and may include either one of DC inlet 21 and AC inlet 22.

Charger 25 includes an inverter and a boost converter, none of which are shown. According to a control command from ECU 100, the inverter converts the AC power, supplied via AC inlet 22 from the charging equipment, into a DC power, and outputs the DC power to the boost converter. According to a control command from ECU 100, the boost converter boosts the voltage of the DC power output from the inverter, and outputs the boosted DC power to power line PL.

SMR 31 is electrically connected between power line PL and battery 32. According to a control command from ECU 100, SMR 31, for example, electrically connects battery 32 to power line PL, or electrically isolate battery 32 from power line PL.

Battery 32 is electrically connected to power line PL via SMR 31. Battery 32 includes a battery pack formed of multiple cells (e.g., approximately 200 cells). Each of the cells, included in the battery pack, is a secondary battery, such as a lithium-ion battery or a nickel-hydrogen battery. For example, battery 32 supplies PCU 4 with an electric power for generating a driving force for vehicle 1, or stores a regenerated energy from PCU 4. Note that a capacitor, such as an electric double layer capacitor, may be employed, instead of battery 32. Note that battery 32 is one example of a "power storage device" according to the present disclosure.

Voltage sensor 33 detects a voltage VB of battery 32. Current sensor 34 detects a current IB input to/output from battery 32. Each sensor outputs a result of the detection to ECU 100.

PCU 4 includes an inverter not shown. PCU 4 may include a bidirectional DC-to-DC converter, in addition to the inverter. According to a control command from ECU 100, PCU 4 converts the DC power, transmitted through power line PL, into an AC power, and outputs the AC power to motor generator 5.

Motor generator 5 is an AC rotating electric machine, for example, a three-phase AC synchronous motor which includes a rotor having a permanent magnet embedded therein. Motor generator 5 operates with supply of the AC power from PCU 4, and drives driving wheels 6.

According to a control command from ECU 100, display 7 displays various pieces of information related to vehicle 1. Display 7 will be described, with reference to FIG. 2.

Mode selector switch 8 is for using different sources of supply of electric power to motor generator 5. Mode selector switch 8 receives a driver's operation to switch between the driving modes, and outputs to ECU 100 a signal indicating a driving mode selected by the driver to switch to. Details of the driving modes will be described, with reference to FIG. 3.

Vehicle speed sensor 9 calculates the traveling speed (a vehicle speed V) of vehicle 1. Specifically, vehicle speed sensor 9 can calculate vehicle speed V from a distance to travel per predetermined time period which is obtained by multiplying the rotational velocity of the wheels, such as driving wheels 6, by a coefficient (such as the wheel circumference).

ECU 100 includes a processor, such as a central processing unit (CPU), a memory, such as a read only memory (ROM) and a random access memory (RAM), and input/output ports (none of which are shown). In response to signals from sensors, ECU 100 outputs various control commands to control the devices so that vehicle 1 is brought into a desired state. ECU 100 may be divided into multiple units by function.

<Display>

Figure 2:
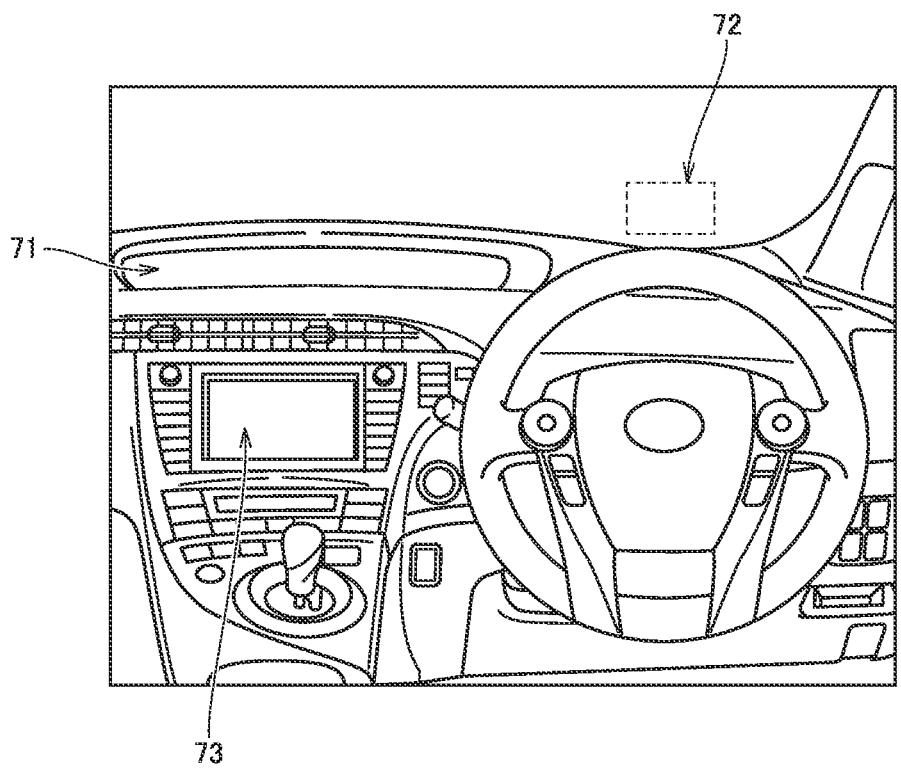
FIG. 2 is a diagram illustrating an example configuration of a display.

FIG. 2 is a diagram illustrating an example configuration of display 7. Referring to FIG. 2, as display 7, vehicle 1 includes a multi-information display (MID) 71, a head-up display (HUD) 72, and a navigation screen 73.

MID 71 is disposed on the upper part of the instrument panel and in the vicinity of the windshield. MID 71 is configured to display the information about vehicle 1 (e.g., the state of charge (SOC) of battery 32, vehicle speed V, travel distance, the outside air temperature, fuel efficiency, electric power efficiency, etc.).

HUD 72 projects various pieces of information in front of the driver's (the driver's) field of view as a virtual image. HUD 72 also displays the vehicle speed of vehicle 1, the direction of travel to the destination, traffic signs, etc.

Navigation screen 73 is a display of a navigation system (not shown) disposed within the instrument panel. The navigation system includes a global positioning system (GPS) receiver for locating the vehicle 1 based on a radio wave from an artificial satellite. The navigation system displays, on navigation screen 73, the current location of vehicle 1 and a recommended route to the destination of vehicle 1, based on the GPS the information of vehicle 1 and road map data that is stored in a memory (not shown).

<Driving Mode>

Figure 3:
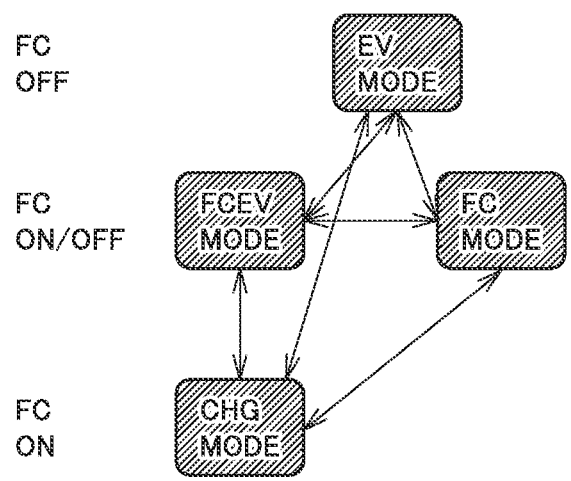
FIG. 3 is a diagram for illustrating driving modes of the vehicle.

FIG. 3 is a diagram for illustrating driving modes of vehicle 1. Referring to FIG. 3, vehicle 1 has three driving modes, which are referred to as "EV mode," "FC mode," and "FCEV mode." Note that the driving modes may transition from one mode to another based on a driver operation on mode selector switch 8 or in response to a travelling situation (e.g., SOC of battery 32) of vehicle 1 (automatic switching).

In the EV mode, an electric power is supplied from battery 32 to motor generator 5. In the EV mode, power generation by FC stack 12 is stopped. The EV mode corresponds to a "first driving mode" according to the present disclosure.

In the FC mode, FC stack 12 is the primary source of supply of an electric power to motor generator 5. In other words, in the FC mode, an electric power supplied from FC stack 12 to motor generator 5 is greater than an electric power supplied from battery 32 to motor generator 5. The FC mode corresponds to a "second driving mode" according to the present disclosure.

In the FCEV mode, battery 32 is the primary source of supply of an electric power to motor generator 5. In other words, in the FCEV mode, an electric power supplied from battery 32 to motor generator 5 is greater than an electric power supplied from FC stack 12 to motor generator 5. The FCEV mode corresponds to a "third driving mode" according to the present disclosure.

Note that vehicle 1 may further has a charge mode (described as a "CHG mode"). In the CHG mode, when the electric power stored in battery 32 is depleting (e.g., when the electric power stored in battery 32 decreases below the lower limit of a given range), an electric power is generated by FC stack 12 while vehicle 1 is being stopped, and the generated electric power is charged to battery 32.

<Indications of Fuel Efficiency and Electric Power Efficiency>

It is contemplated that both the instantaneous fuel efficiency and the instantaneous electric power efficiency of vehicle 1 are displayed on MID 71. The driver can be aware of an impact of the vehicle on the environment by viewing the indications of the instantaneous fuel efficiency and the instantaneous electric power efficiency, while driving vehicle 1. Moreover, by obtain the feedback as to whether his/her driving has a large impact on the environment, the driver is allowed to improve the driving (eco-drive) techniques, which can reduce the impact on the environment.

The inventor focuses on the fact that when the instantaneous fuel efficiency and the instantaneous electric power efficiency are displayed on MID 71, it is difficult for the driver to correctly understood what is meant by the instantaneous fuel efficiency and/or the instantaneous electric power efficiency, depending on a driving mode of the fuel cell vehicle. Specifically, when the instantaneous fuel efficiency is displayed in the EV mode, the instantaneous fuel efficiency can be a too big value because the power generation by FC stack 12 is stopped in the EV mode and the hydrogen fuel is not consumed. Stated differently, the instantaneous fuel efficiency can be displayed as a fixed value as if it is stuck at the upper limit of the indicator for the instantaneous fuel efficiency (e.g., 99.9 [km/kg]).

In the FC mode, since FC stack 12 is the primary source of supply of electric power to motor generator 5, an electric power may be supplied rarely from battery 32 to motor generator 5. Due to this, when the instantaneous electric power efficiency is displayed in the FC mode, the instantaneous electric power efficiency is a too big value and, for example, the instantaneous electric power efficiency can be displayed as if it is stuck at the upper limit of the indicator for the instantaneous electric power efficiency (e.g., 99.9 [km/kWh]).

For this reason, in the present embodiment, the indication is switched, depending on a driving mode of vehicle 1, between the instantaneous fuel efficiency and the instantaneous electric power efficiency. In the EV mode, the instantaneous electric power efficiency is displayed on MID 71, and the instantaneous fuel efficiency is not displayed. In the FC mode, the instantaneous fuel efficiency is displayed on MID 71, and the instantaneous electric power efficiency is not displayed. This prevents the driver from being confused by a too big value being displayed as the instantaneous fuel efficiency or the instantaneous electric power efficiency. Accordingly, the usability related to the fuel efficiency and the electric power efficiency improves.

Note that the present embodiment will be described with reference to displaying the instantaneous fuel efficiency and/or the instantaneous electric power efficiency on MID 71. However, the instantaneous fuel efficiency and/or the instantaneous electric power efficiency may be displayed on other device (HUD 72 or navigation screen 73) that is included in display 7.

<Control Procedure>

Figure 4:
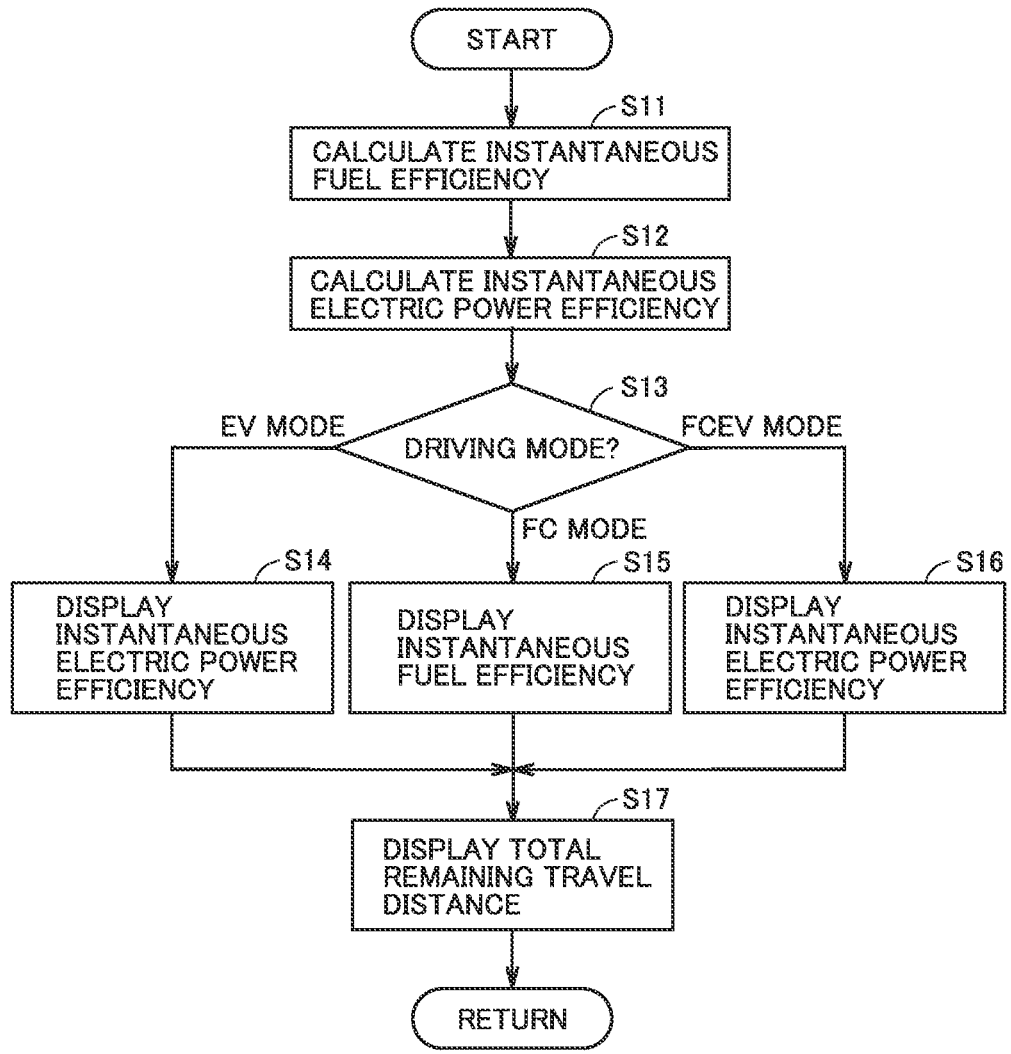
FIG. 4 is a flowchart showing a display control over a multi-information display, according to the embodiment.

FIG. 4 is a flowchart showing a display control over MID 71 in the present embodiment. The flowcharts shown in FIG. 4 and FIG. 8 described below are performed, for example, each time a predetermined cycle elapses. Each of the steps included in these flowcharts is basically implemented by software processing by ECU 100, but may be implemented by dedicated hardware (an electric circuit) fabricated within ECU 100. Hereinafter, steps are abbreviated as "S."

In S11, ECU 100 calculates the instantaneous fuel efficiency of vehicle 1. ECU 100 can calculate the instantaneous fuel efficiency from a distance traveled by vehicle 1 per predetermined time period (e.g., a few seconds), obtained from vehicle speed sensor 9, and an amount of hydrogen fuel consumed per predetermined time period, obtained from a sensor (not shown) provided for the FC stack.

In S12, ECU 100 calculates the instantaneous electric power efficiency of vehicle 1. ECU 100 can calculate the instantaneous electric power efficiency from the distance traveled by vehicle 1 per predetermined time period, obtained from vehicle speed sensor 9, and an amount of electric power consumed per predetermined time period obtained from voltage sensor 33 and current sensor 34 provided for battery 32.

In S13, ECU 100 determines the current driving mode of vehicle 1. If vehicle 1 is in the EV mode ("EV mode" in S13), ECU 100 proceeds in the process to S14, and displays on MID 71 the instantaneous electric power efficiency calculated in S12.

Figure 5:
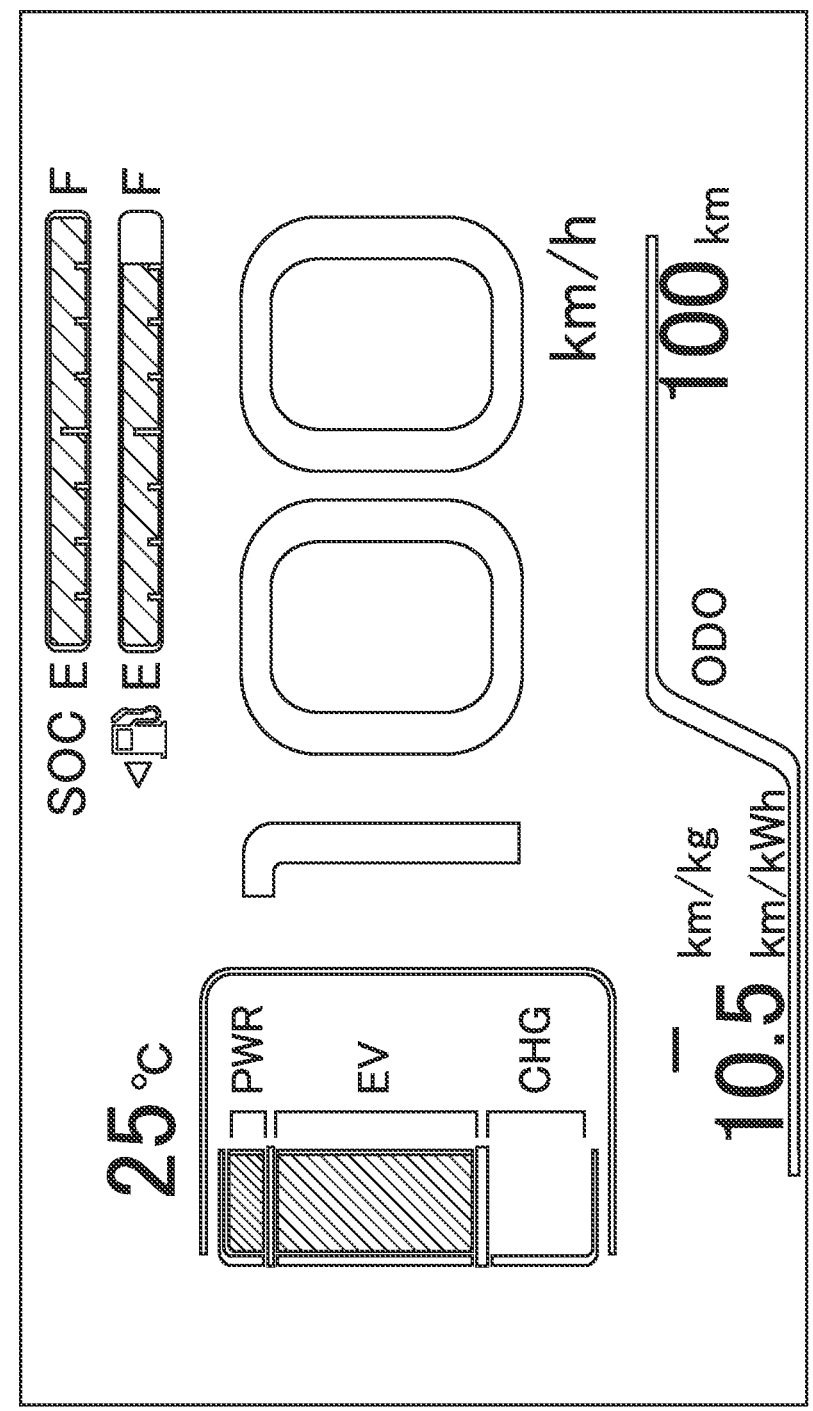
FIG. 5 is a diagram illustrating example display content of the multi-information display in an EV mode.

FIG. 5 is a diagram illustrating example display content of MID 71 in the EV mode. Referring to FIG. 5, SOC of battery 32 and the residual fuel within hydrogen tank 11 are displayed on MID 71 (the upper portion of FIG. 5). Furthermore, as shown in the lower left of FIG. 5, the instantaneous electric power efficiency of vehicle 1 (in this example, 10.5 [km/kWh]) is displayed on MID 71. Meanwhile, the instantaneous fuel efficiency is not displayed on MID 71.

Note that the display mode of the instantaneous electric power efficiency is not limited to the display mode illustrated in FIG. 5. For example the meter indication may be provided in which the instantaneous electric power efficiency is represented by the position indicated by the hand of an analog dial, or a segment display may be provided in which the instantaneous electric power efficiency is represented by the number of segments that changes in a stepwise manner. Moreover, the mode in which the instantaneous fuel efficiency is hidden is not limited to the horizontal-line (bar) display as shown in FIG. 5. For example, the numeric value of the instantaneous fuel efficiency may be hidden or the instantaneous fuel efficiency may be completely hidden, including the numeric value and the unit. Alternatively, an indication (so-called, grey out) may be employed in which the indication of the instantaneous fuel efficiency is made unnoticeable by lowering the brightness or darkening the color tone. The grey out is also encompassed in "not displayed."

Returning to FIG. 4, if vehicle 1 is in the FC mode ("FC mode" in S13), ECU 100 proceeds in the process to S15, and displays on MID 71 the instantaneous fuel efficiency calculated in S11. Meanwhile, the instantaneous electric power efficiency is not displayed on MID 71.

Figure 6:
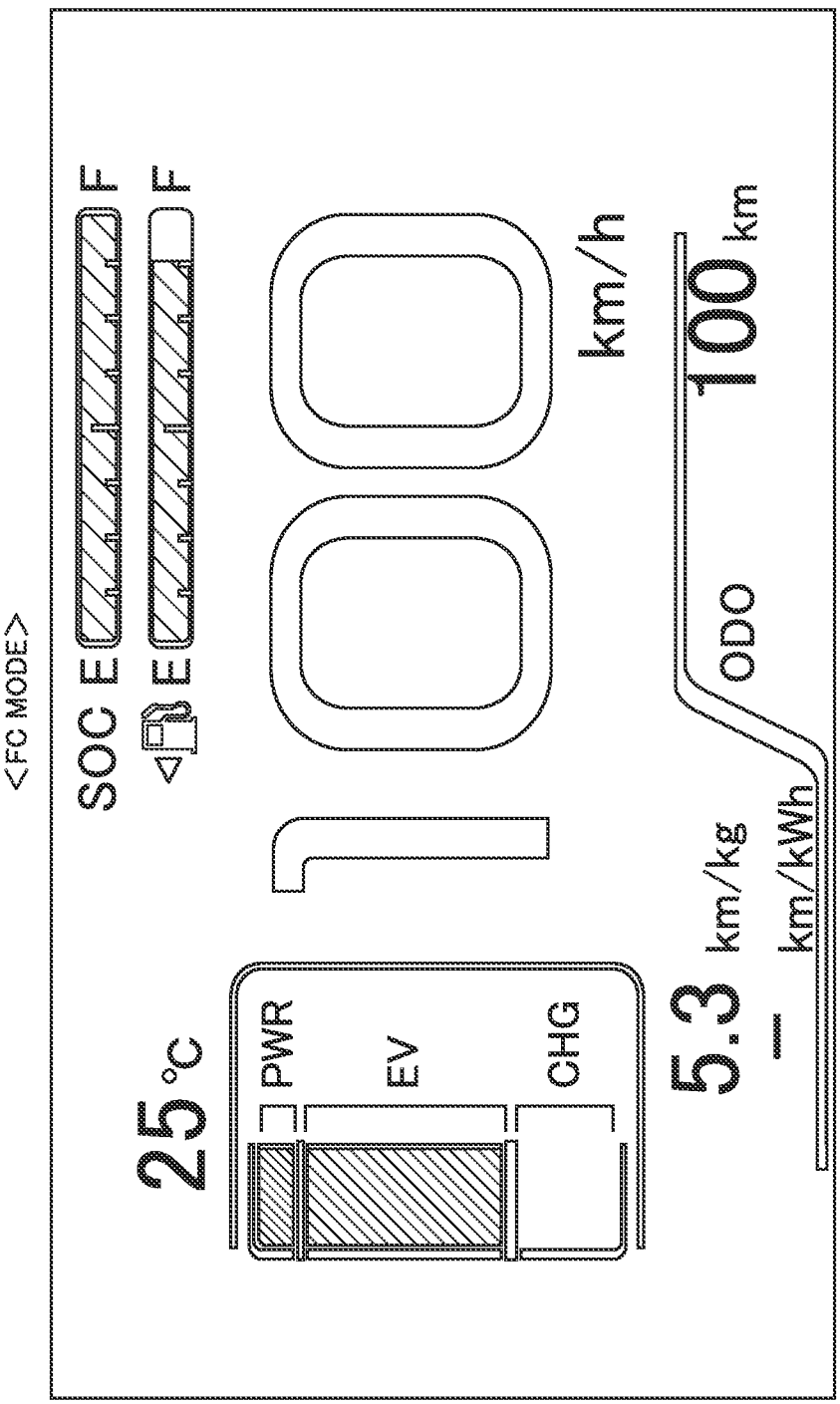
FIG. 6 is a diagram illustrating example display content of the multi-information display in an FC mode.

FIG. 6 is a diagram illustrating example display content of MID 71 in the FC mode. Referring to FIG. 6, the instantaneous fuel efficiency (in this example 5.3 [km/kg]) of vehicle 1 is displayed on MID 71, and the instantaneous electric power efficiency is not displayed. As the instantaneous fuel efficiency display mode and the instantaneous electric power efficiency hide mode, various modes that are similar to the description with respect to FIG. 5 can be employed.

Returning to FIG. 4, if vehicle 1 is in the FCEV mode ("FCEV mode" in S13), ECU 100 proceeds in the process to S16, and displays on MID 71 the instantaneous electric power efficiency, calculated in S12. Meanwhile, the instantaneous fuel efficiency is not displayed on MID 71.

Figure 7:
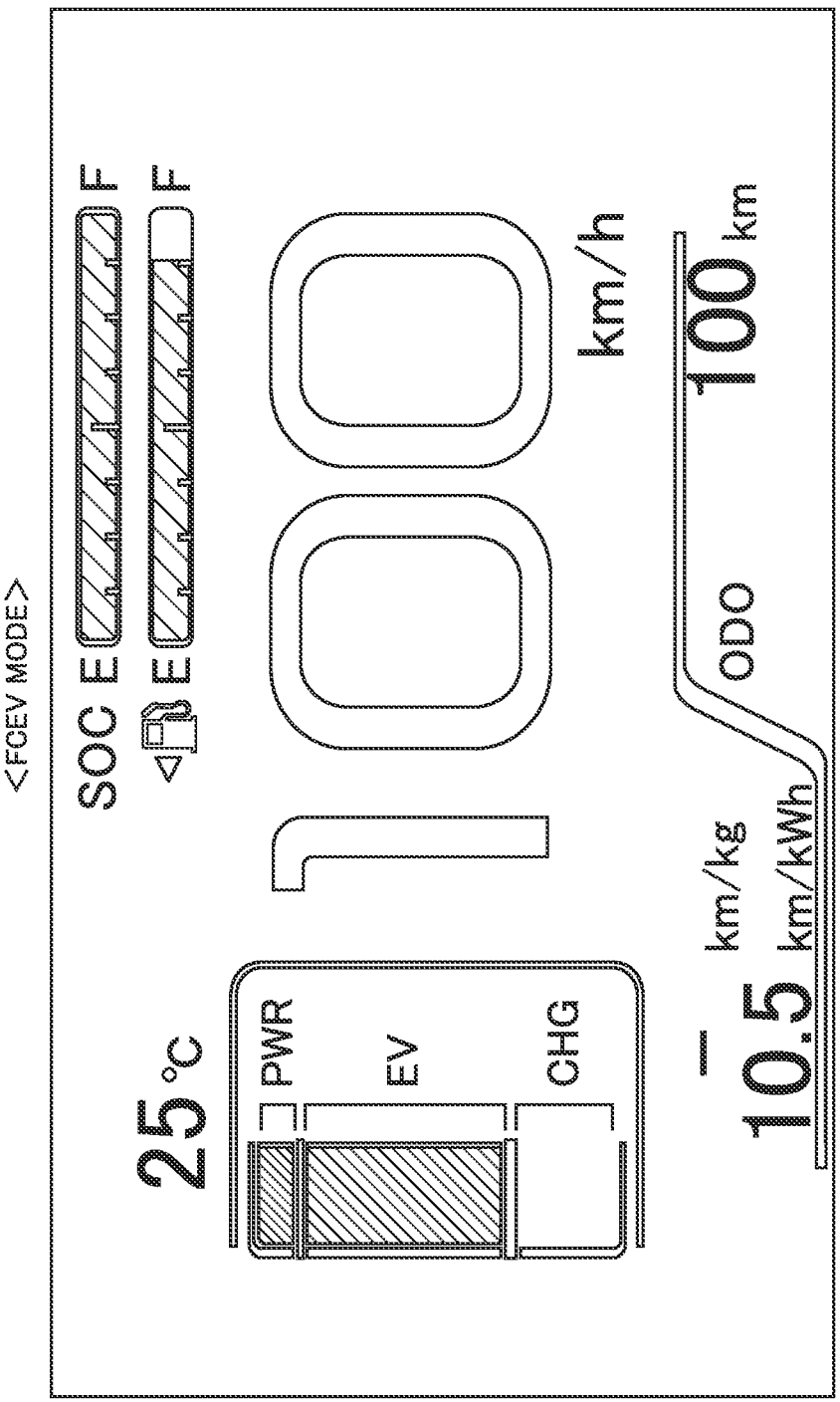
FIG. 7 is a diagram illustrating example display content of the multi-information display in an FCEV mode.

FIG. 7 is a diagram illustrating example display content of MID 71 in the FCEV mode. Referring to FIG. 7, the instantaneous electric power efficiency (e.g., 10.5 [km/kWh]) of vehicle 1 is displayed on MID 71, and the instantaneous fuel efficiency is not displayed. Note that the indicated values of the instantaneous fuel efficiency and/or the instantaneous electric power efficiency in S14 through S16 are each remained the same until the next time they are updated (the arrival of the next cycle).

Referring again to FIG. 4, as any of the processes in S14 through S16 ends, ECU 100 calculates the total remaining travel distance of vehicle 1, and displays the calculated value on MID 71 (S17). The total remaining travel distance of vehicle 1 can be calculated, for example, as the sum of a distance D1 and a distance D2 (D1+D2), where distance D1 refers to a distance that vehicle 1 can travel with the hydrogen fuel remained in hydrogen tank 11 and distance D2 refers to a distance that vehicle 1 can travel with the amount of electric power remained in battery 32. Note that distance D1 can be calculated from the hydrogen fuel level and an average fuel efficiency of vehicle 1 (which may be the specification value or the actual value thereof). Similarly, distance D2 can also be calculated from the electric power remained in battery 32 and an average electric power efficiency of vehicle 1. As S17 ends, the process returns to the main routine, and the series of processes is repeated each time a cycle arrives.

As described above, in the present embodiment, in the EV mode in which the power generation by FC stack 12 is stopped, only the instantaneous electric power efficiency is displayed, and the instantaneous fuel efficiency is not displayed. This avoids indication of the instantaneous fuel efficiency in the EV mode as if the instantaneous fuel efficiency is stuck at the upper limit. Moreover, in the FC mode in which FC stack 12 is the primary source of supply of electric power to motor generator 5, only the instantaneous fuel efficiency is displayed, and the instantaneous electric power efficiency is not displayed. This avoids indication of the instantaneous electric power efficiency in the FC mode as if the instantaneous electric power efficiency is stuck at the upper limit. Furthermore, in the FCEV mode in which battery 32 is the primary source of supply of electric power to motor generator 5, only the instantaneous electric power efficiency is displayed, and the instantaneous fuel efficiency is not displayed. This avoids indication of the instantaneous fuel efficiency in the FCEV mode as if the instantaneous fuel efficiency is stuck at the upper limit. Thus, according to the present embodiment, indications that may confuse the driver can be prevented, thereby improving the usability related to the fuel efficiency and the electric power efficiency.

[Variation]

Figure 8:
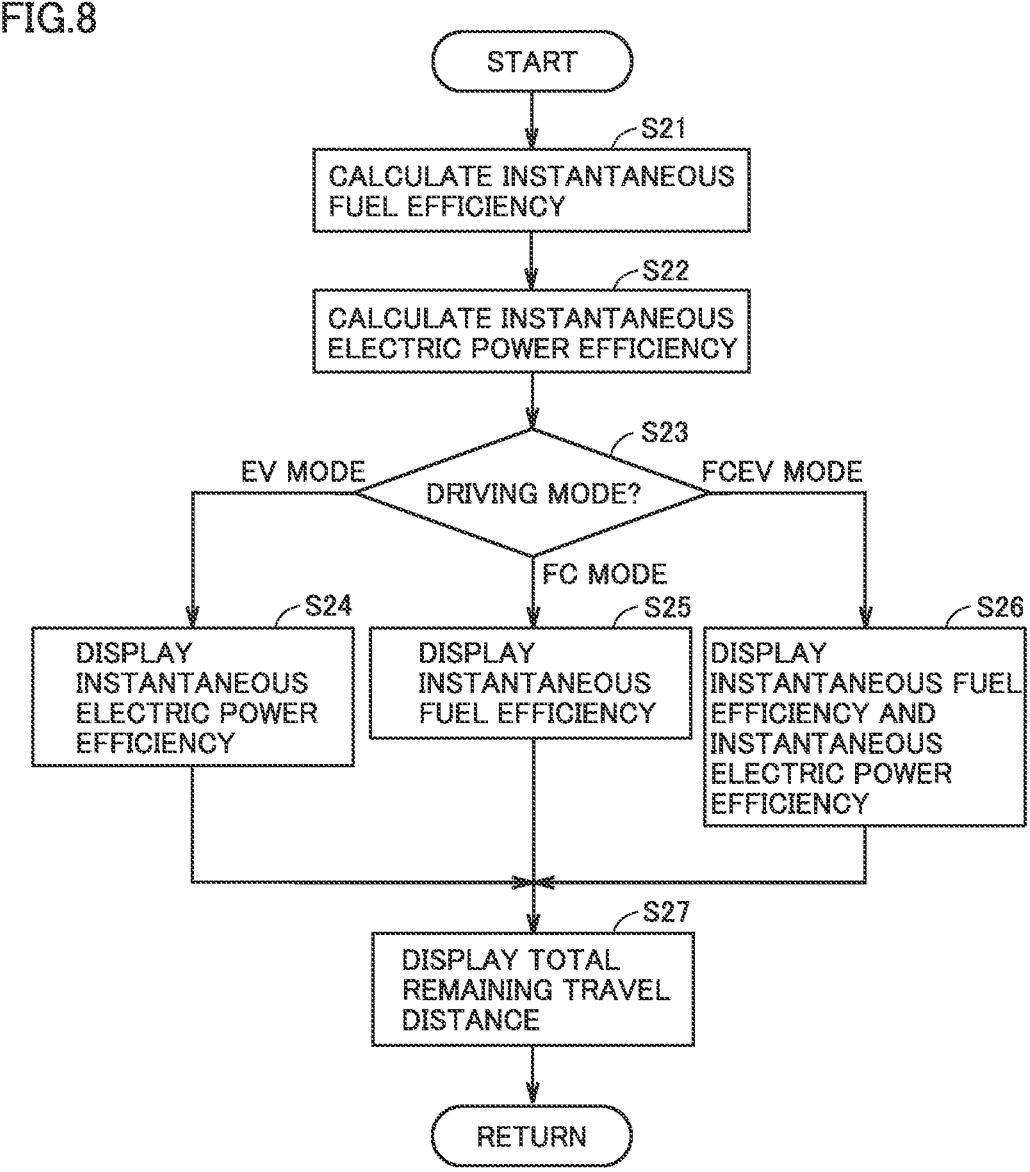
FIG. 8 is a flowchart showing a display control over the multi-information display according to Variation.

FIG. 8 is a flowchart showing a display control over MID 71, according to Variation of the embodiment. Referring to FIG. 8, the flowchart is the same as the flowchart according to the embodiment (see FIG. 4), except for including S26, instead of S16. Since the other processes as the same as corresponding processes according to the embodiment, the descriptions thereof will not be repeated here.

If vehicle 1 is in the FCEV mode ("FCEV mode" in S23), ECU 100 proceeds in the process to S26. In S26, ECU 100 displays, on MID 71, both the instantaneous fuel efficiency calculated in S21 and the instantaneous electric power efficiency calculated in S22.

Figure 9:
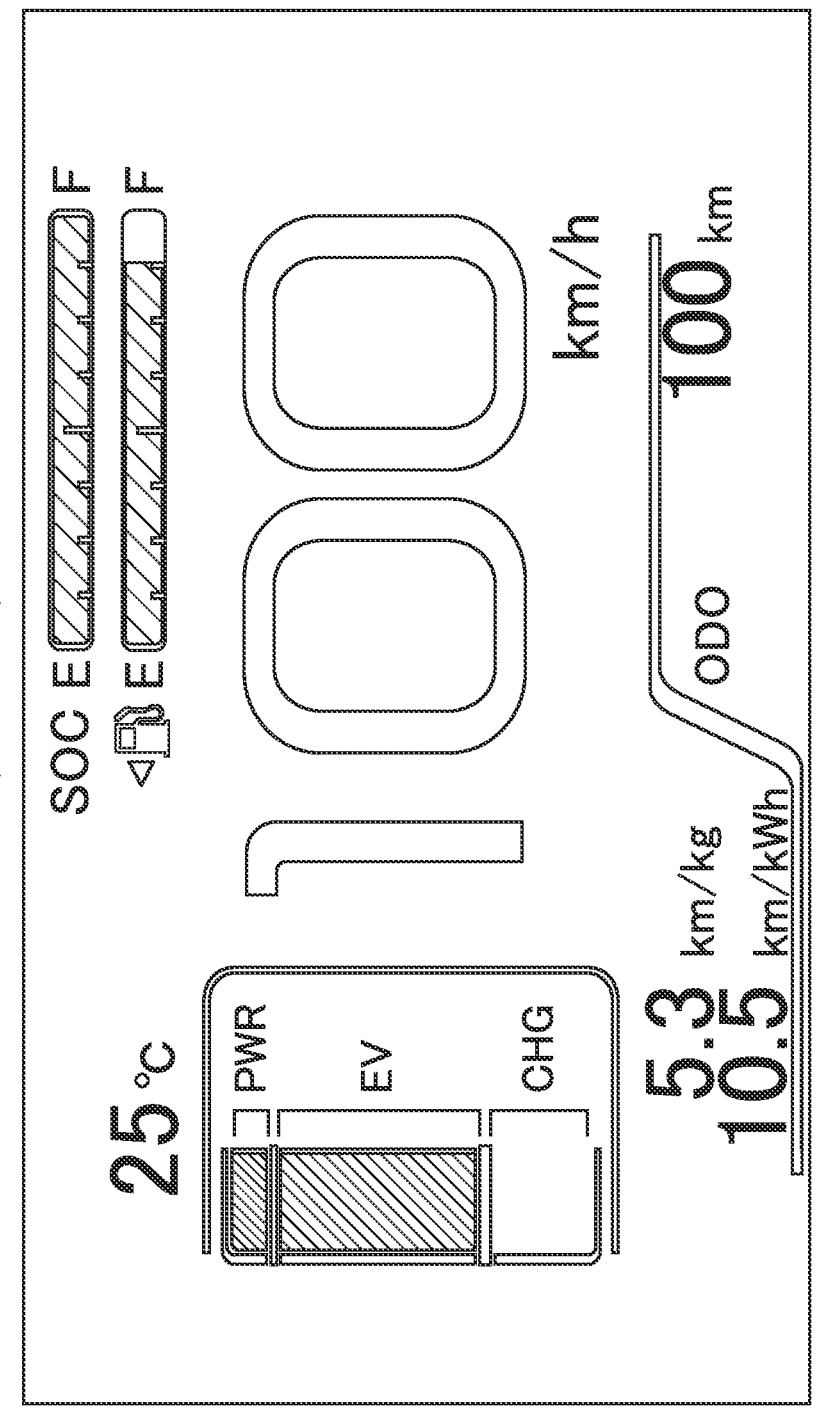
FIG. 9 is a diagram illustrating another example display content of the multi-information display in the FCEV mode.

FIG. 9 is a diagram illustrating other example display content of MID 71 in the FCEV mode. Referring to FIG. 9, both the instantaneous fuel efficiency (e.g., 5.3 [km/kg]) and the instantaneous electric power efficiency (e.g., 10.5 [km/kWh]) of vehicle 1 are displayed on MID 71 according to Variation.

As described above, in Variation, in the FCEV mode, the instantaneous fuel efficiency is also displayed on MID 71, in addition to the instantaneous electric power efficiency. A typical fuel cell vehicle has a battery whose capacity is significantly less than (e.g., a fraction of to several tenths of) the amount of electric power that can be generated by a fuel cell (the FC stack). Accordingly, a situation is likely to occur in which the electric power generated by FC stack 12 is consumed by motor generator 5 to some extent. Therefore, by providing the driver with the indication of the instantaneous fuel efficiency that is related to the consumption of the electric power stored in FC stack 12, in addition to the instantaneous electric power efficiency, the driver is allowed to drive vehicle 1, while being aware of both the instantaneous fuel efficiency and the instantaneous electric power efficiency.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A fuel cell vehicle, comprising:
   a motor that generates a driving force for the fuel cell vehicle;
   a fuel cell that supplies the motor with an electric power that is generated using a hydrogen fuel;
   a power storage device that supplies the motor with an electric power stored in the power storage device;
   a display; and
   a controller that controls the display, wherein
   the fuel cell vehicle has a first driving mode, a second driving mode, and a third driving mode, wherein
   in the first driving mode, power generation by the fuel cell is always stopped so that the hydrogen fuel is not consumed and an electric power is supplied from the power storage device to the motor,
   in the second driving mode, the fuel cell is switched between operating and stopped, the motor is powered by electric power supplied from the fuel cell and the power storage device, and an electric power supplied from the fuel cell to the motor is greater than an electric power supplied from the power storage device to the motor, in the third driving mode, the fuel cell is switched between operating and stopped, and an electric power supplied from the power storage device to the motor is greater than an electric power supplied from the fuel cell to the motor, in the first driving mode, the controller controls the display so that the display displays an instantaneous electric power efficiency of the fuel cell vehicle and does not display an instantaneous fuel efficiency of the fuel cell vehicle, in the second driving mode, the controller controls the display so that the display displays the instantaneous fuel efficiency of the fuel cell vehicle and does not display the instantaneous electric power efficiency of the fuel cell vehicle, and in the third driving mode, the controller controls the display so that the display displays both the instantaneous fuel efficiency and the instantaneous electric power efficiency of the fuel cell vehicle.

2. The fuel cell vehicle according to claim 1, wherein the controller controls the display so that the display displays a total travel distance that the fuel cell vehicle can travel with an electric power that can be generated by the fuel cell and the electric power stored in the power storage device.

3. The fuel cell vehicle of claim 1, wherein:

when the display displays the instantaneous electric power efficiency of the fuel cell vehicle and display of the instantaneous fuel efficiency of the fuel cell vehicle includes displaying a numeric value and a unit, and when the display does not display the instantaneous electric power efficiency of the fuel cell vehicle or the instantaneous fuel efficiency of the fuel cell vehicle, a numeric value of the instantaneous electric power efficiency of the fuel cell vehicle or the numeric value of the instantaneous fuel efficiency of the fuel cell vehicle, respectively, is hidden, but a unit is displayed.

4. A method of control of a fuel cell vehicle having a first driving mode, a second driving mode and a third driving mode, wherein in the first driving mode, power generation by a fuel cell is always stopped so that a hydrogen fuel is not consumed and an electric power is supplied from a power storage device to a motor, and in the second driving mode, the fuel cell is switched between operating and stopped, the motor is powered by electric power supplied from the fuel cell and the power storage device, and an electric power supplied from the fuel cell to the motor is greater than an electric power supplied from the power storage device to the motor, in the third driving mode, the fuel cell is switched between operating and stopped, and an electric power supplied from the power storage device to the motor is greater than an electric power supplied from the fuel cell to the motor, the method comprising:

displaying an instantaneous electric power efficiency of the fuel cell vehicle on a display and not displaying an instantaneous fuel efficiency of the fuel cell vehicle on the display, while the fuel cell vehicle is traveling in the first driving mode;

displaying the instantaneous fuel efficiency of the fuel cell vehicle on the display and not displaying the instantaneous electric power efficiency of the fuel cell vehicle on the display, while the fuel cell vehicle is traveling in the second driving mode; and displaying both instantaneous fuel efficiency and the instantaneous electric power efficiency of the fuel cell vehicle, while the fuel cell vehicle is traveling in the third driving mode.

5. A fuel cell vehicle, comprising:

a motor that generates a driving force for the fuel cell vehicle;

a fuel cell that supplies the motor with an electric power that is generated using a hydrogen fuel;

a power storage device that supplies the motor with an electric power stored in the power storage device;

a display; and a controller that controls the display, wherein the fuel cell vehicle has a first driving mode, a second driving mode and a third driving mode, wherein in the first driving mode, power generation by the fuel cell is always stopped so that the hydrogen fuel is not consumed and an electric power is supplied from the power storage device to the motor, in the second driving mode, the fuel cell is switched between operating and stopped, the motor is powered by electric power supplied from the fuel cell and the power storage device, and an electric power supplied from the fuel cell to the motor is greater than an electric power supplied from the power storage device to the motor, in the third driving mode, the fuel cell is switched between operating and stopped, and an electric power supplied from the power storage device to the motor is greater than an electric power supplied from the fuel cell to the motor, in the first driving mode, the controller controls the display so that the display displays an instantaneous electric power efficiency of the fuel cell vehicle and does not display an instantaneous fuel efficiency of the fuel cell vehicle, in the second driving mode, the controller controls the display so that the display displays the instantaneous fuel efficiency of the fuel cell vehicle and does not display the instantaneous electric power efficiency of the fuel cell vehicle, and in the third driving mode, the controller controls the display so that the display displays the instantaneous electric power efficiency of the fuel cell vehicle and does not display the instantaneous fuel efficiency of the fuel cell vehicle.

6. The fuel cell vehicle of claim 5, wherein:

when the display displays the instantaneous electric power efficiency of the fuel cell vehicle and display of the instantaneous fuel efficiency of the fuel cell vehicle includes displaying a numeric value and a unit, and when the display does not display the instantaneous electric power efficiency of the fuel cell vehicle or the instantaneous fuel efficiency of the fuel cell vehicle, a numeric value of the instantaneous electric power efficiency of the fuel cell vehicle or the numeric value of the instantaneous fuel efficiency of the fuel cell vehicle, respectively, is hidden, but a unit is displayed.

* * * * *